April 24, 1934.  H. J. L. FRANK ET AL  1,956,439
BALL BEARING SWITCH AND SWITCHBOARD CONSTRUCTION
Filed April 24, 1931  13 Sheets-Sheet 1

INVENTORS
Harrison J. L. Frank &
William K. Frank
BY
ATTORNEY
Francis D. Hardesty.

April 24, 1934.     H. J. L. FRANK ET AL     1,956,439
BALL BEARING SWITCH AND SWITCHBOARD CONSTRUCTION
Filed April 24, 1931     13 Sheets-Sheet 2

Harrison J. L. Frank &
William H. Frank
INVENTORS

BY
Francis D. Hardesty
ATTORNEY

April 24, 1934.  H. J. L. FRANK ET AL  1,956,439
BALL BEARING SWITCH AND SWITCHBOARD CONSTRUCTION
Filed April 24, 1931  13 Sheets-Sheet 3
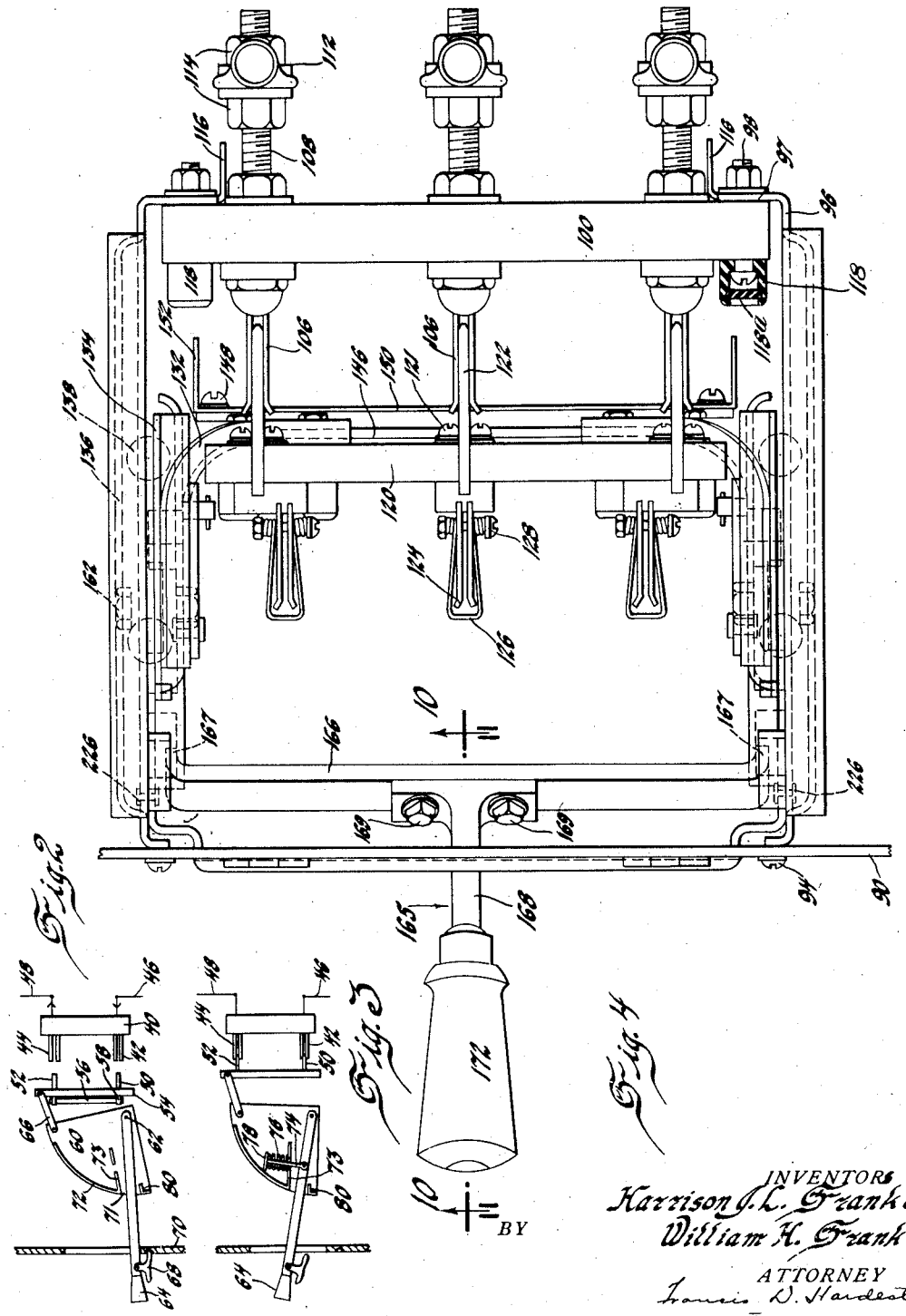
INVENTORS
Harrison J. L. Frank &
William H. Frank
BY
ATTORNEY
Francis D. Hardesty April 24, 1934.   H. J. L. FRANK ET AL   1,956,439
BALL BEARING SWITCH AND SWITCHBOARD CONSTRUCTION
Filed April 24, 1931   13 Sheets-Sheet 4

INVENTORS
Harrison J. L. Frank &
William K. Frank
BY
ATTORNEY
Francis D. Hardesty

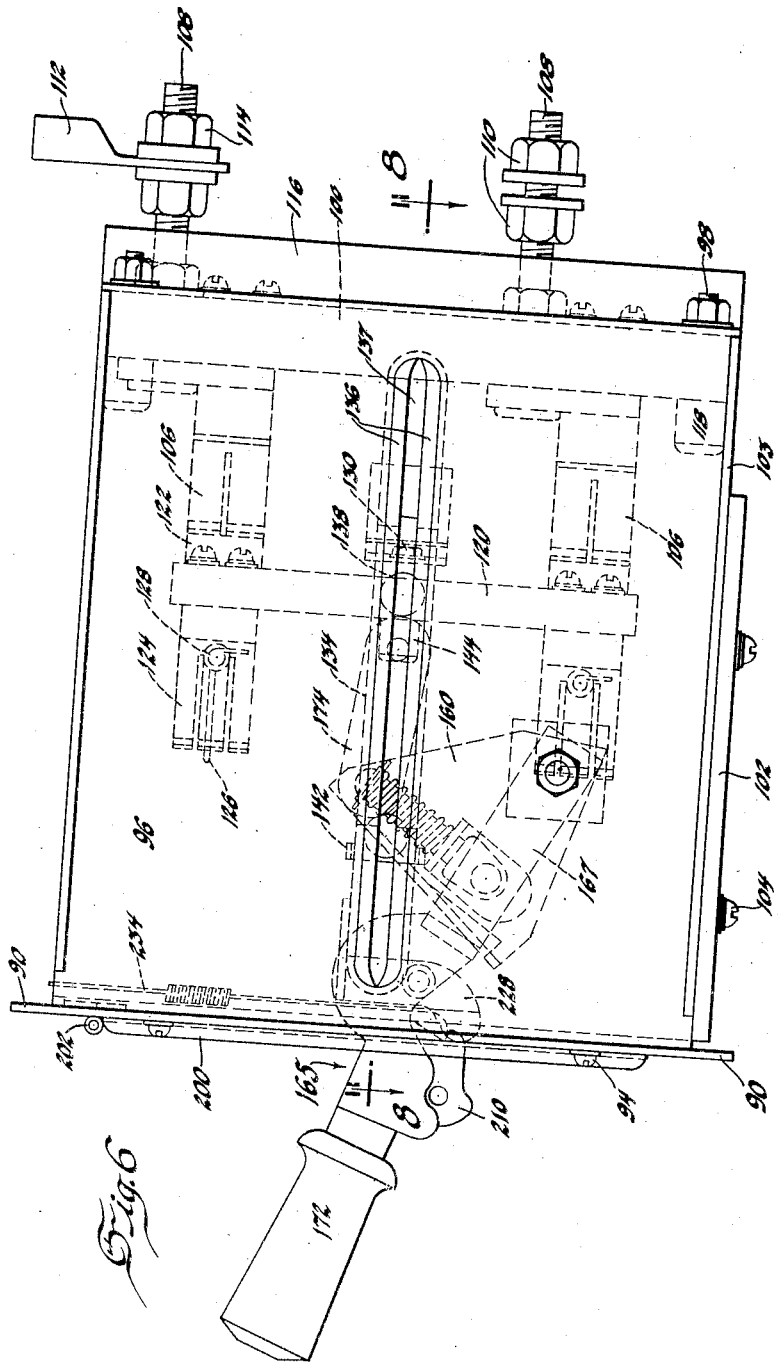

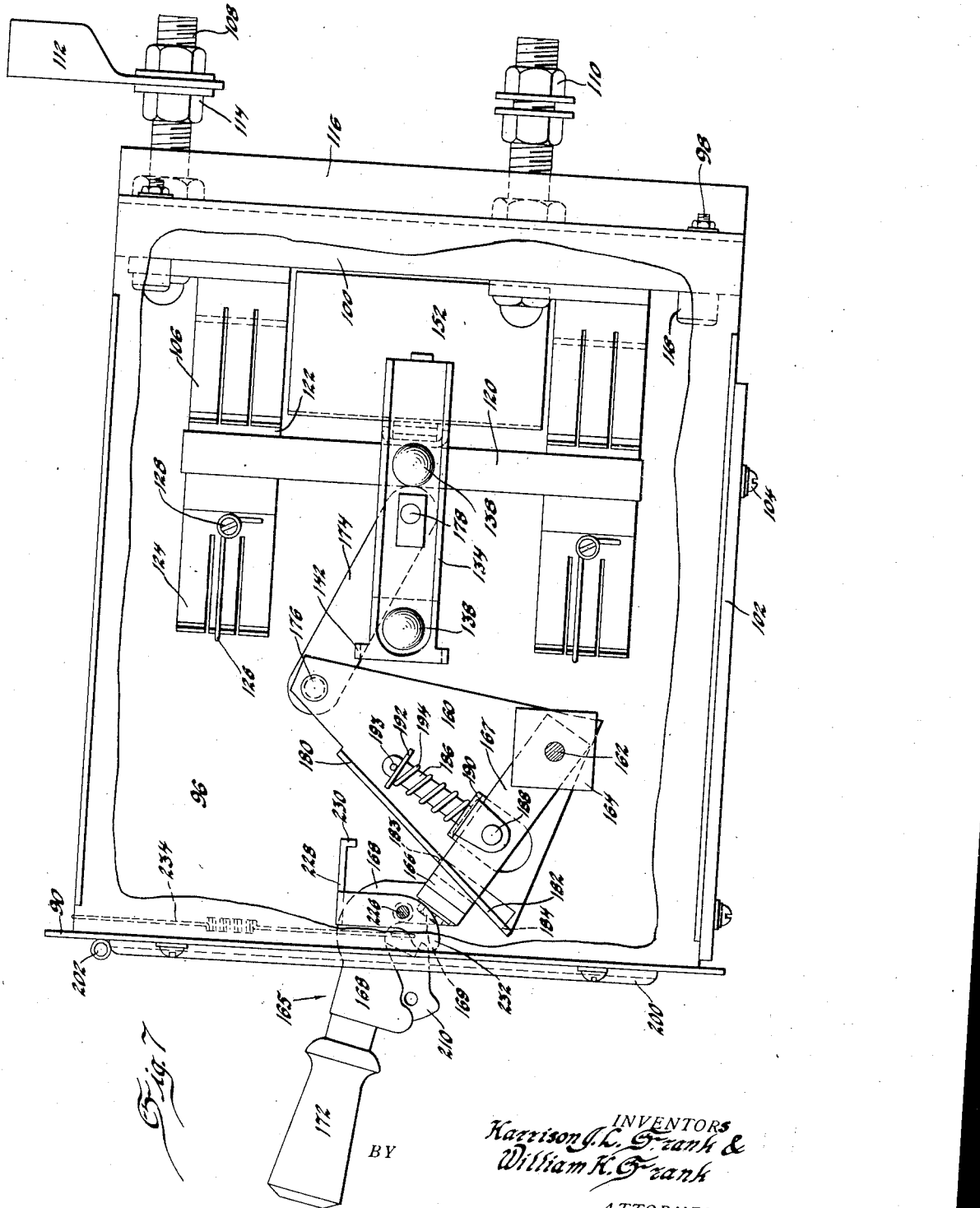

April 24, 1934.  H. J. L. FRANK ET AL  1,956,439
BALL BEARING SWITCH AND SWITCHBOARD CONSTRUCTION
Filed April 24, 1931   13 Sheets-Sheet 7
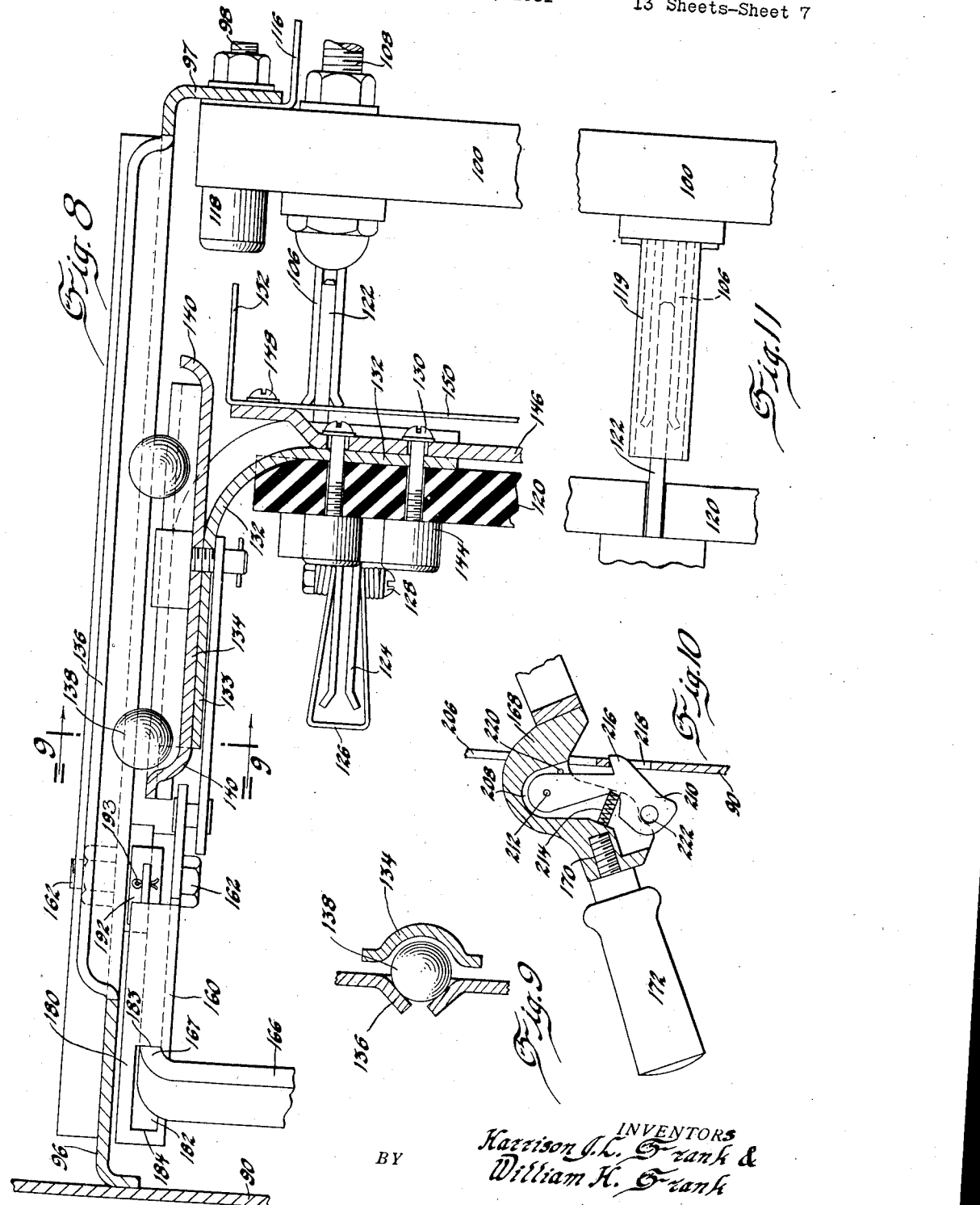
INVENTORS
Harrison J. L. Frank &
William H. Frank
BY
ATTORNEY
Francis D. Hardesty

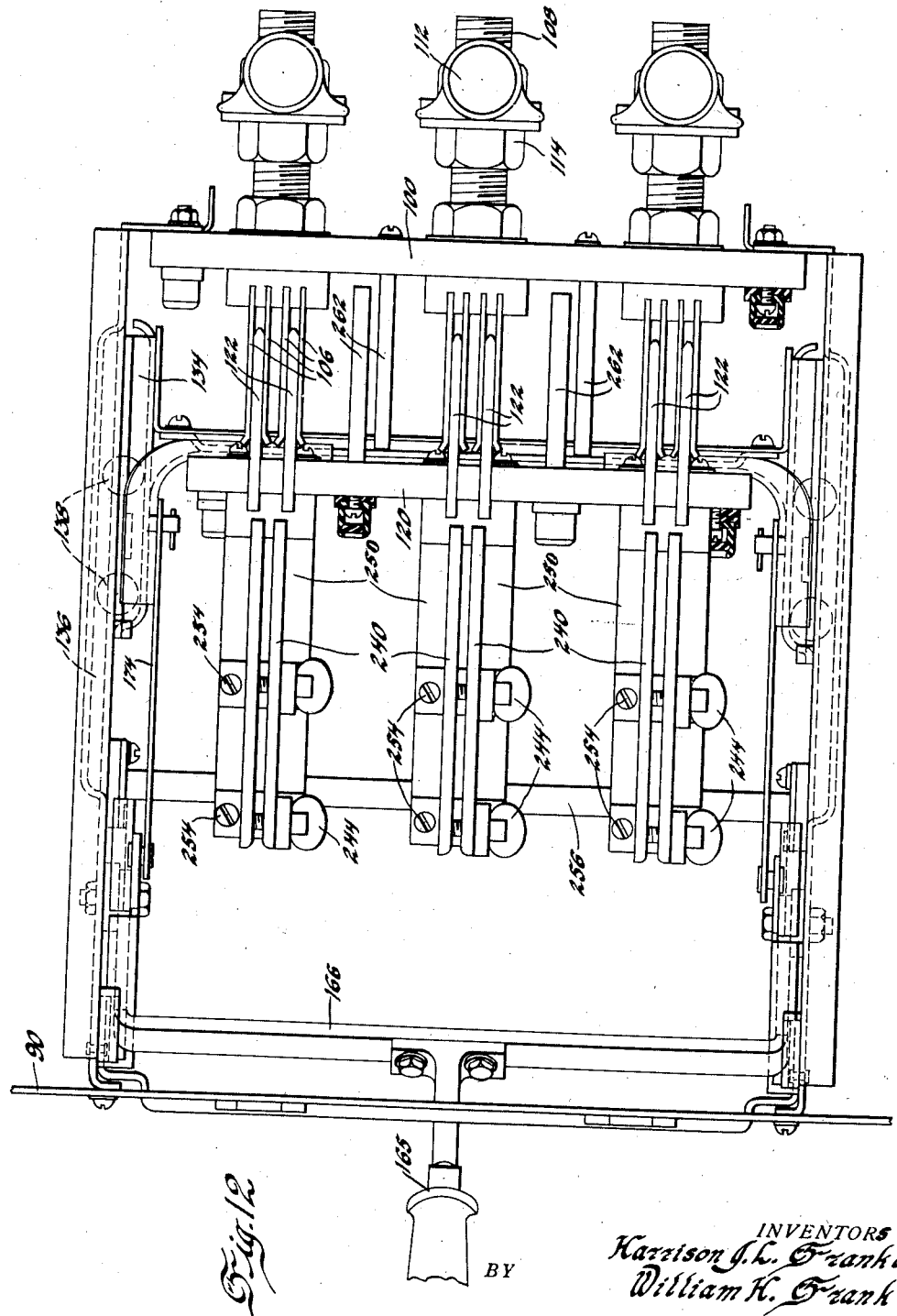

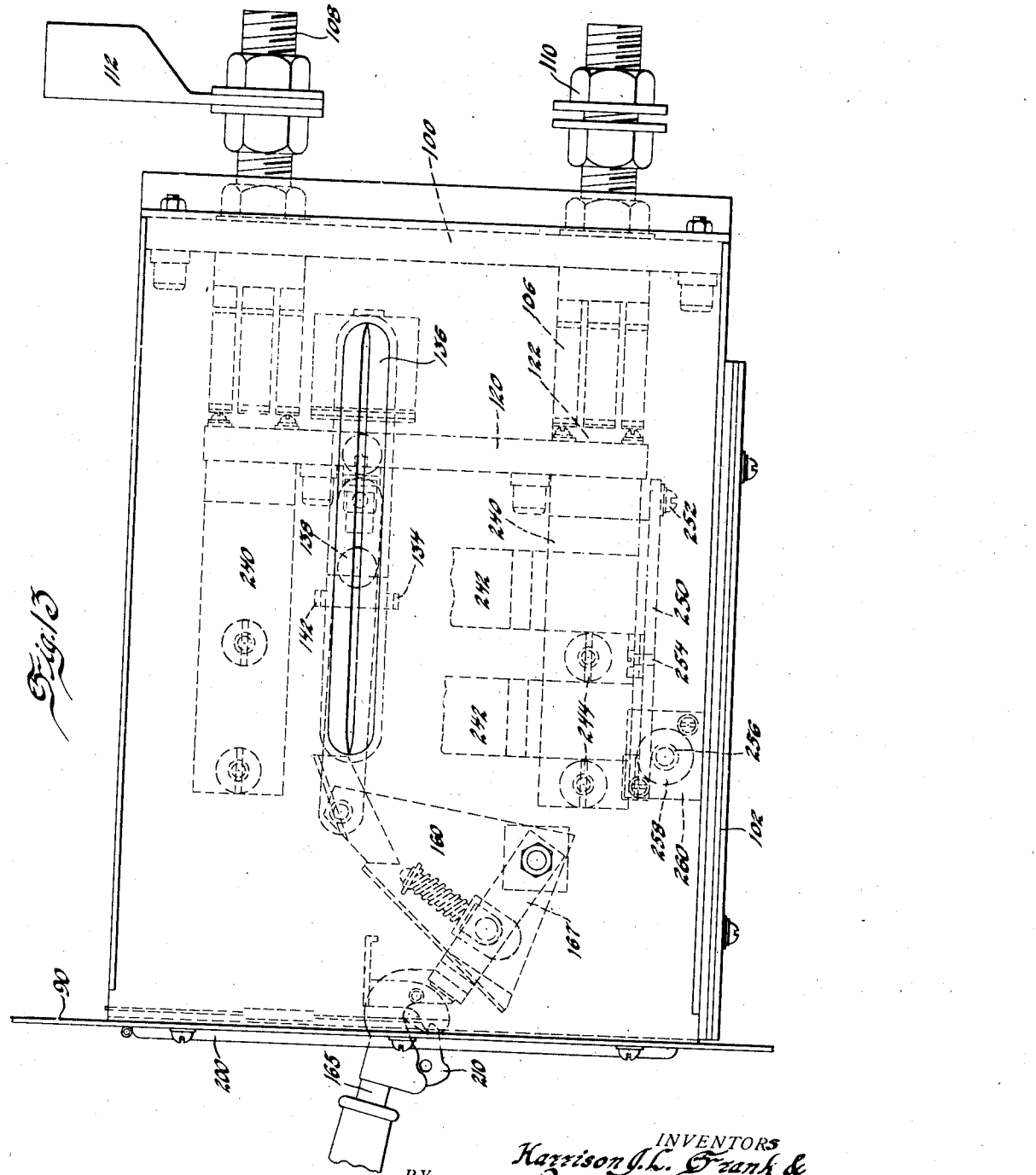

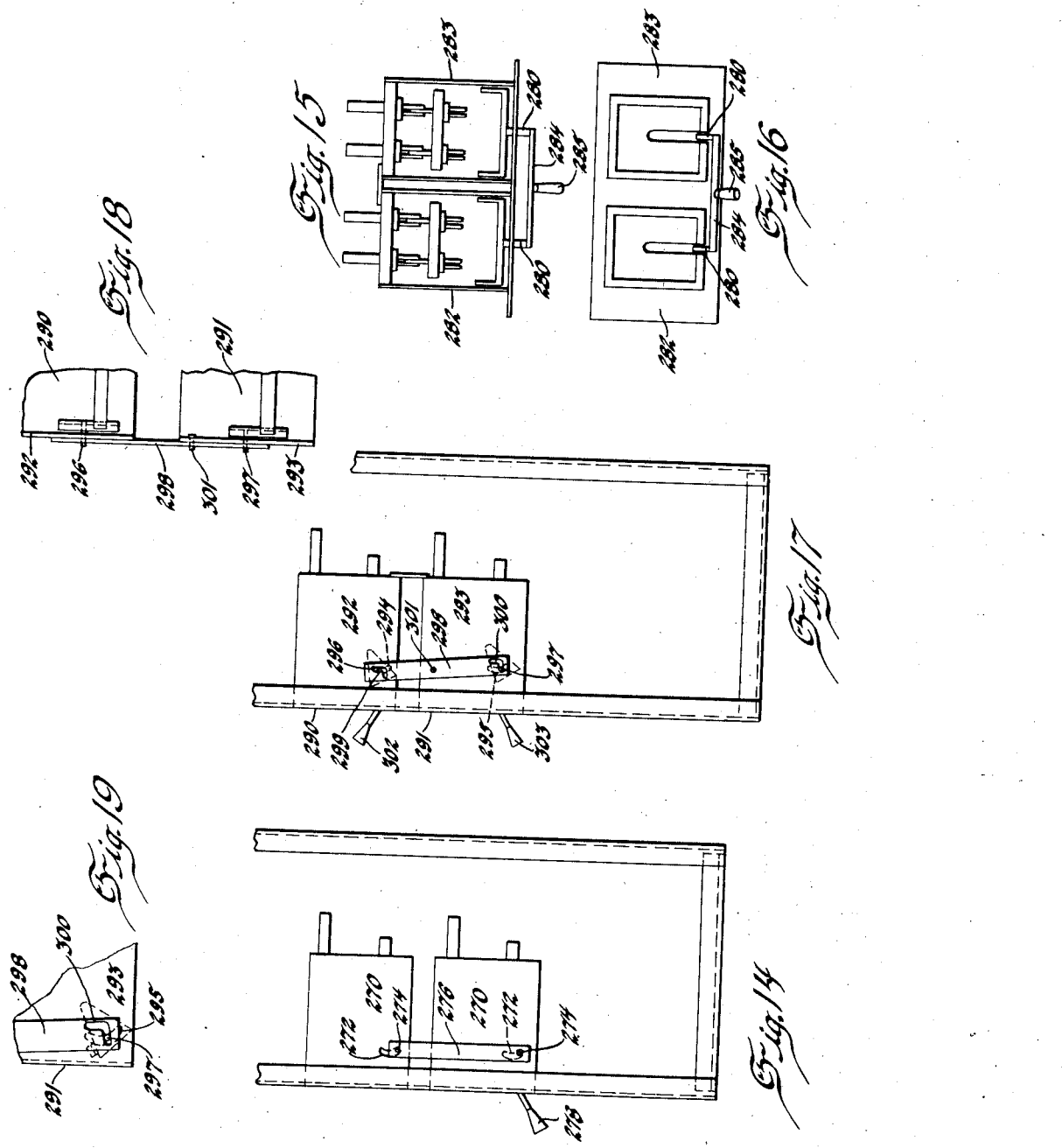

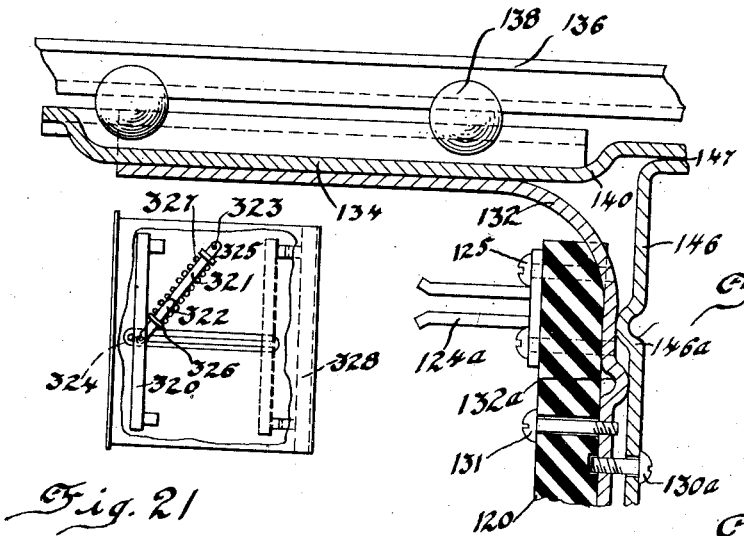
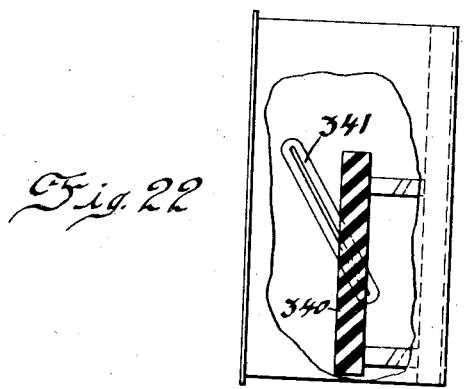
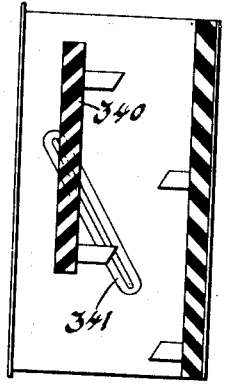
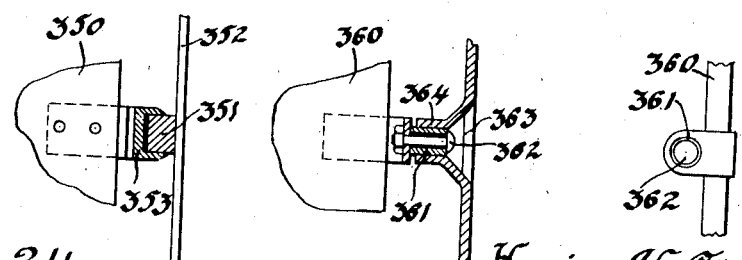

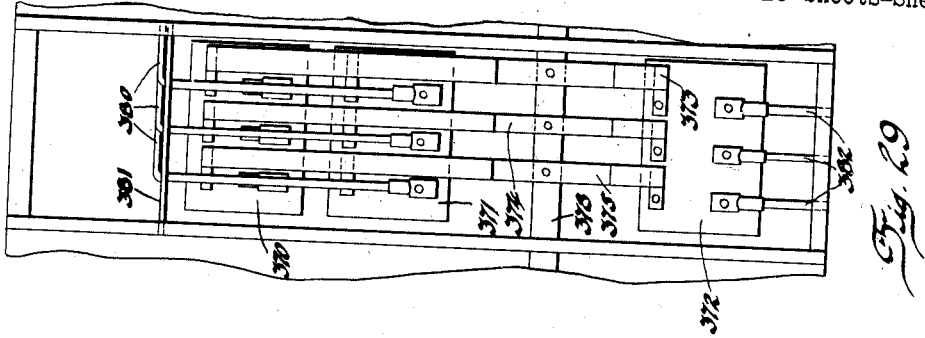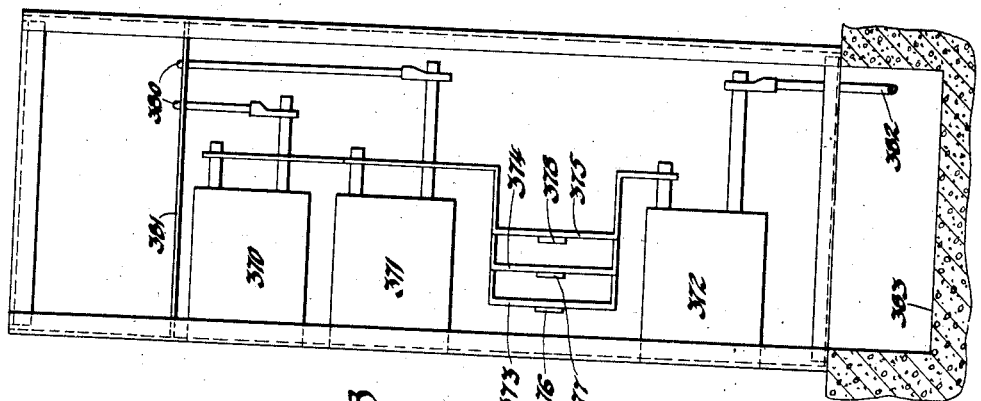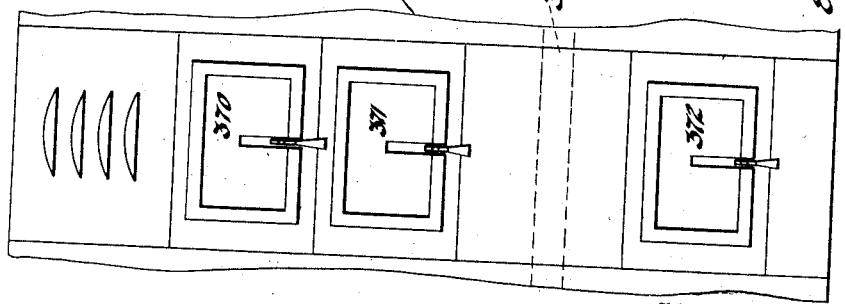

April 24, 1934.　　　H. J. L. FRANK ET AL　　　1,956,439
BALL BEARING SWITCH AND SWITCHBOARD CONSTRUCTION
Filed April 24, 1931　　13 Sheets-Sheet 13

Harrison J. L. Frank &
William H. Frank
INVENTORS

BY
Francis D. Hardesty
ATTORNEY

Patented Apr. 24, 1934

1,956,439

UNITED STATES PATENT OFFICE 1,956,439

BALL BEARING SWITCH AND SWITCHBOARD CONSTRUCTION

Harrison J. L. Frank and William H. Frank, Detroit, Mich., assignors to Bulldog Electric Products Company, Detroit, Mich., a corporation of West Virginia Application April 24, 1931, Serial No. 532,656

30 Claims. (Cl. 200—114)

This invention relates to switchboards and to switches.

An object of this invention is a novel form of switchboard, one that employs standardized parts which can be manufactured in quantities and in factories, employing factory methods and factory machines, as contrasted with the old and obsolete type of switchboard which employed parts designed expressly for the particular job.

Further objects are novel forms of switches particularly adapted for use in forming a standardized switchboard, the switches having certain novel details which combine to form a more efficient and practical switch.

Still further objects are novel forms of connections between adjacent switches which will permit of multiple operation of the same. One advantage of this practice is that two standard 600 Amp. switches, for example, may be operated simultaneously, to form, in effect, a 1200 Amp. switch. It will be observed that the switchboard of the invention is particularly adapted and designed to carry out the idea above expressed.

An important object of this invention is a switch board incorporating the principles disclosed in the copending application of Harrison J. L. Frank, Ser. No. 353,343, filed April 8, 1929.

The switchboard of the application above referred to and the switchboard of the present application are alike, in many important respects, in that they make possible flexibility and ease of interchange of the switching units and of the switchboard sections. The switchboards are of the unit, interchangeable section type, and accordingly, it is possible to rearrange these sections at any time, or as desired, to add or subtract sections to or from the original switchboard, without materially disturbing any parts other than those being interchanged, added or subtracted.

A further object is a switchboard having a cable pull box integrally formed as part of the switchboard proper.

A further object is a free standing or self supporting, steel enclosed switchboard, one that is fire proof and one in which the steel enclosure is readily removable from the switchboard so that access to the interior or exterior of the board for any purpose whatsoever is easily possible.

While the switchboard described as being of the free standing or self supporting type, it is contemplated to form a switchboard of a type which is supported from the walls of the adjoining building structure, the only alterations being, of course, in the frame construction and in certain auxiliary details.

It will be observed that the switchboard of this application is so designed that it can be used as a free standing or self supporting switchboard or as a wall support switchboard without great alterations or other manipulations in the parts.

A further object is a switch particularly adapted for use in switchboards, the switch being slightly larger than the fuses required so as to effect space economies.

Further, the switch may be provided with the guide construction disclosed, which construction is far superior to others previously disclosed, in that it provides self-alignment of the contacts during the switching operation, and in that it permits floating contact between the parts when they are in switch on position.

The guide means above described are so constructed that they do not interfere with switching operations or movement of the switching apparatus.

A further object is a switch having a reciprocating panel therein and an enclosing casing, the side walls of the casing being provided with frictionless guides and supports for the reciprocating panel.

A further object is a double break fused switch incorporating a reciprocating panel, and means to support and guide it in its movement, the means including frictionless ball or roller bearings.

Still further objects will readily occur to those skilled in the art upon reference to the following description and the accompanying drawings in which Fig. 1 shows a switch board of the invention provided with switches which also embody inventions of this case.

Figs. 2 and 3 show, diagrammatically, a novel form of switch.

Fig. 4 is a top plan view of one form of switch, a part being shown in section, the switch being closed.

Fig. 6 is a side view of the switch of Fig. 3.

Fig. 7 is a similar view of the switch of Fig. 3, a side being cut away to show operating parts more clearly.

Fig. 8 is a section as if on the line 8—8 of Fig. 6.

Fig. 9 is a section as if on the line 9—9 of Fig. 3.

Fig. 10 is a section thru the handle and trigger mechanism, as if on the line 10—10 of Fig. 4.

Fig. 11 is a top plan view of a detail, showing an arc smothering device.

Fig. 12 is a top plan view of a second form of switch.

Fig. 13 is a side view of the switch of Fig. 12.

Fig. 14 shows how two switches are connected for vertical tandem operation.

Fig. 15 is a top plan view of two switches arranged for horizontal tandem operation.

Fig. 16 is a top plan view of Fig. 15.

Fig. 17 shows how two switches may be interlocked for double throw operation.

Fig. 18 is a detail of parts constructed in accordance with Fig. 17.

Fig. 19 is an enlarged portion of Fig. 17.

Fig. 20 is a view like that of Fig. 8 but showing a modified construction.

Fig. 21 shows, to small scale, an alternative form of quick make and break device for the reciprocating panel.

Fig. 22 is a view, to small scale, showing a switch wherein the guide slots are at an acute angle with respect to the base of the switch so that the reciprocating panel moves towards the stationary panel in a path other than at right angles thereto, this figure showing the parts in "on" position.

Fig. 23 shows the same switch with parts in switch "off" position.

Fig. 24 shows a modified form of guiding means, embodying a channel and bar construction.

Fig. 25 is a further modification of the guiding means, wherein a roller, secured to the reciprocating panel, rolls in a slot in the switch casing side wall.

Fig. 26 is a side view of a portion of the reciprocating panel roller support of Fig. 25.

Fig. 27 is a front view of a switchboard section showing bus details.

Fig. 28 is a right side view of the board of Fig. 27, further showing a cable trench.

Fig. 29 is a rear view of the board of Fig. 27.

Switch board

Figure 1:
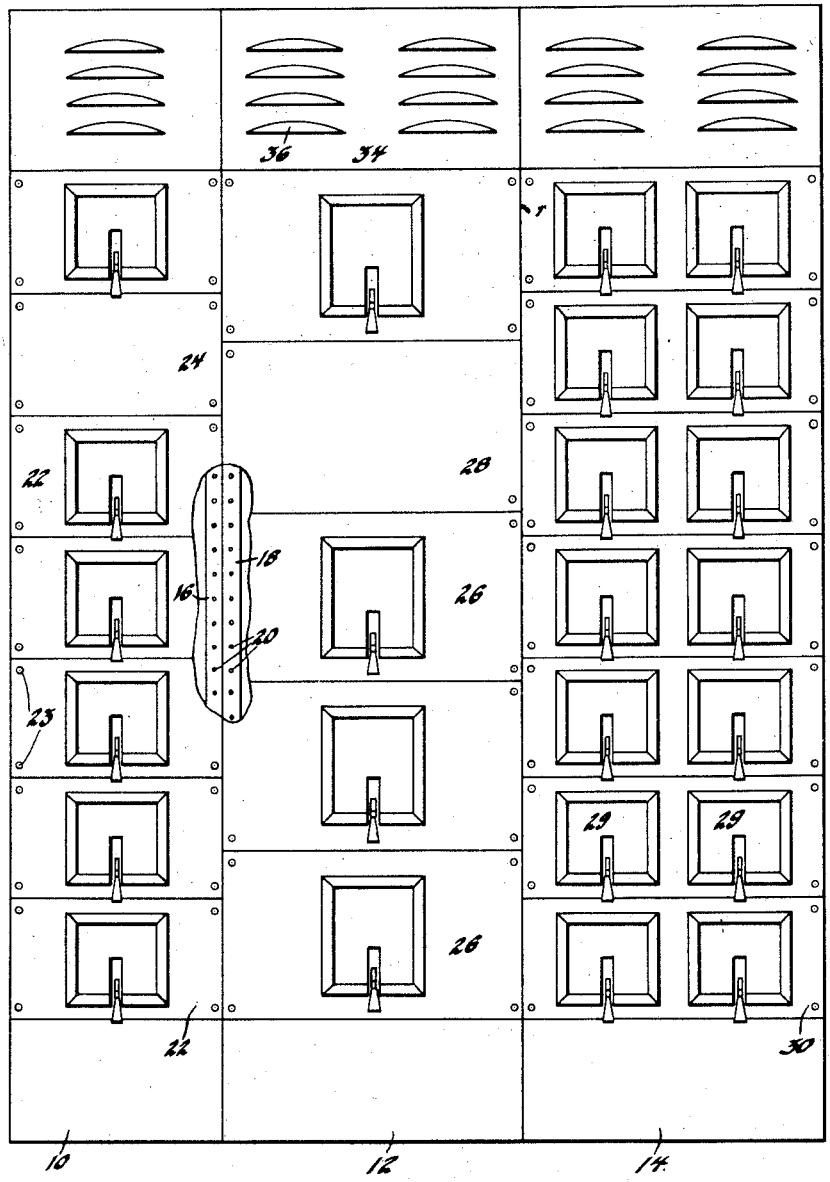
Fig. 1a shows a frame adapted for use in a switchboard of the invention.
Fig. 1b shows a corner detail of the frame.

As can be readily understood, there has become desirable in the switch board industry a switch board which is of the dead-front, safety type and which employs standard parts, which are die made, in factories, and not made on the job, and which may be readily assembled, to meet all conditions.

An object of the design of the switch board of the present invention as well as in the design of the switches which are used with such boards, has been to produce standard part constructions forming a switch board, such standardization effecting numerous economies in the manufacture and assembly of the switches and of the switch board, thus enabling switch boards of this character to be sold in competition with obsolete live-faced, job-assembled, switch boards. This practice enables the public to purchase dead-front, safety switch boards at prices favorably comparable with the prices of obsolete live-front, job assembled, switch boards previously used.

The old type of switch board, in addition to being objectionable because of construction difficulties involved was also highly objectionable because of its live-front characteristics. These switch boards were usually made of slate panels, cut to the required size and matched up with adjacent panels. The panels were then drilled to accommodate the specific layout of the switch board requirements and were then provided with switches which had usually been individually designed and made to order. Bus bars were also designed and made to order, and the switch board was usually supported on parts which were not standardized, being designed and made for the particular job. Every switch board of this character involved a large labor cost, as well as a large engineering cost, in view of the fact that almost every part going into the construction was a more or less individually designed and handmade part and was not a standardized and factory made part.

In switch boards of the present invention the supporting frames, switches, bus bars, enclosing plates, etc., are standardized and made in quantities, in factories, with dies, tools and the like, and because of this quantity production are made much more economically than switch boards and switch board parts previously provided.

Further, switch boards constructed in accordance with the present invention are much more compact than boards previously provided. Less material in their construction is involved and less floor space is consumed.

Further, because of its standardized construction, the switch board of the present invention can be installed much more simply than old boards can and further, can be disassembled and altered, without rendering previously used parts obsolete.

Further, the switch units may be removed individually from the board, towards the front thereof, without disturbing adjacent units, thus differing from old boards wherein the removal of a particular switch often disrupted the entire arrangement of the panel.

Further, it is possible to provide in a switch board of this character, blank spaces covered by blank steel plates which may be removed and replaced by switches, which are added when additional circuits are required.

Further, the switch board is made of sections, which can be readily interchanged, removed, replaced, or added to, without difficulty and as desired.

In the construction of the novel form of switch board, the frames are drilled and tapped on unit centers (2¼ in.) and the switches and their steel fronts are standardized, in several sizes and are interchangeable on the frames, for purposes above outlined. All switches made in accordance with this plan are provided with steel fronts each having a height equal to a non-fractional multiple of the unit distance, (11¼; 13½; 15¾; 20¼, etc.). Further, the mounting holes on the steel fronts are so spaced that distances between them will equal similar multiples of the unit distance (9; 11¼; 13½, etc.). Further, the steel fronts are so dimensioned as to provide several widths (20–28 in.) although of course, variations from these dimensions may be made without departing from the spirit of the invention. It is the usual, tho not necessary, practice to provide on a 20 in. front, one switch, of large or small capacity, as desired, and on a 28 in.

front, one switch of any capacity or two switches of small capacity.

The vertical frame members or supports for the switches whose steel fronts form the front of the frame, are spaced 20 or 28 inches apart, as desired, and the switches are supported thereon by means of their steel fronts. In one vertical panel, which is 20 in. wide, there may be placed a number of different capacity switches, all of which have a 20 in. steel front, and in a 28 in. panel, there may also be placed switches of various capacity, all, however, having a 28 in. front. Blank spaces between switches or at the ends of a panel of switches may be provided, and these spaces may be filled with blank plates to complete the front enclosure of the switch board. The blank plates may be removed later and the spaces then may be utilized for additional switches, when increase in the number of circuits is required.

Other refinements in the manufacture of switch boards in accordance with the plan outlined above may be effected. For example, bus bar compartments, circuit breaker compartments, pull boxes, etc. may be provided. Further, it is possible to provide the switch board with enclosing steel plates covering all four sides of the switch board or only the ends thereof as desired, it being understood that the front of the switch board is formed by the steel fronts of the switches.

As switch boards constructed in accordance with the foregoing have been disclosed, the same will now be described.

Referring to the drawings and to Fig. 1, especially, it will be seen that a switch board comprising three panels 10, 12 and 14, is shown. The panel 10, in accordance with the dimensions listed above, is 20 inches wide, whereas the panels 12 and 14 are 28 inches wide. The supporting frames forming these panels include vertical supports 16 and 18, bolted or riveted to each other to form a frame, and provided with tapped holes 20 which are 2¼ inches from one another along the supports. The switches in the panel 10 are provided with steel fronts 22, each of which is 20 inches wide and each of which may be of any one of the standard heights, that is to say, on each front 22, the dimension from top to bottom is equal to a non-fractional multiple of 2¼ inches. The steel fronts 22 shown in place on panel 10 happen to be 11¼ inches in height. Mounting holes 23 for the fronts are provided and it will be observed that these holes are evenly spaced from the top and bottom edges of the steel front and that they are 9 inches apart. It will be observed that a blank plate 24 in panel 10 has been provided and this blank plate may be removed and the space behind it occupied by a switch when an additional circuit is required on this panel.

Similarly the 28 inch panel 12 is provided with a plurality of switches having steel fronts 26, and it will be observed that each of the steel fronts 26 is so dimensioned that its height is equal to a non-fractional multiple of 2¼ inches, 15¾ inches, being the dimension of the switches which happen to be illustrated. This panel also contains a blank plate 28 for purposes previously described.

The 28 inch panel 14 contains a number of switches 29 which are arranged two to each steel front 30, and it will be observed that each of these steel fronts is so dimensioned that its height is equal to a non-fractional multiple of 2¼ inches, 11¼ being the height shown. This panel happens to be completely occupied and there are no blank plates therein.

It will be seen that each steel front 30 supports two switches, whereas the steel fronts 22 and 26 are provided with but one switch each. Of course it is to be understood that the 28 inch steel front 26 of panel 12 may be replaced by a steel front like that at 30, having two switches, in which case blank filler plates may be used, if necessary, to fill the gap left by such substitution.

The switch board is surmounted by a pull box 34 provided with louvers 36 and it will be understood that various accessories such as circuit breakers, bus bars, etc., may be provided on the switch board if desired, the disclosure and invention concerned only with the arrangement of the switches on the switch board.

Figure 1A:
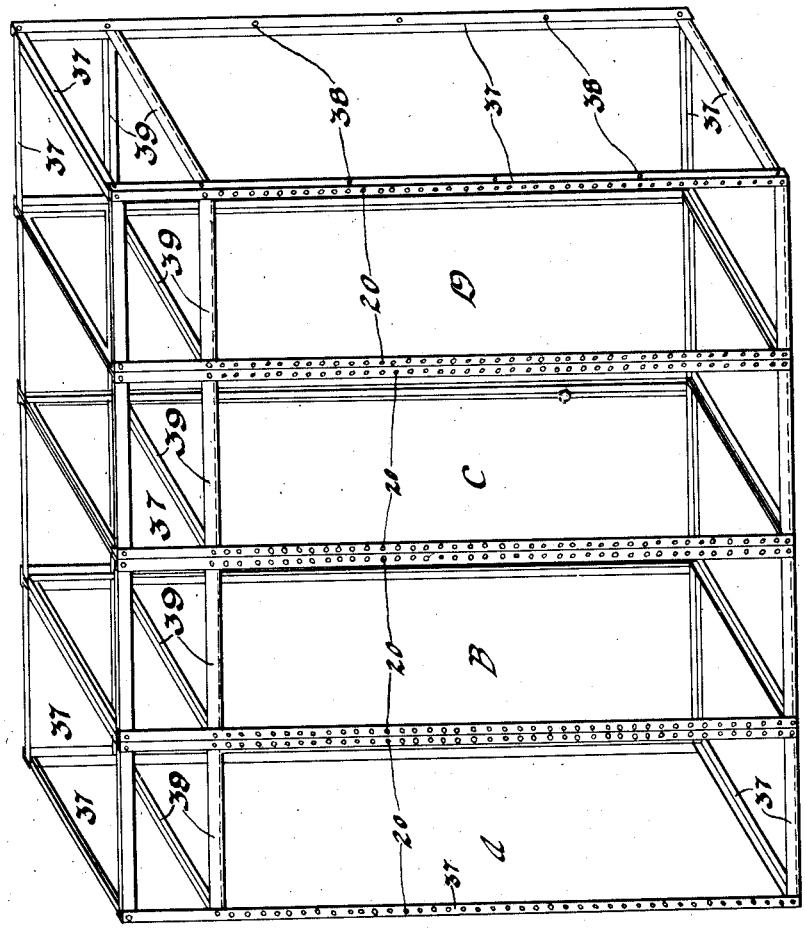
Figure 1B:
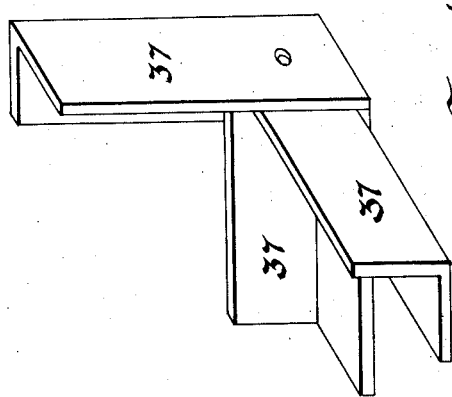
Figure 5:
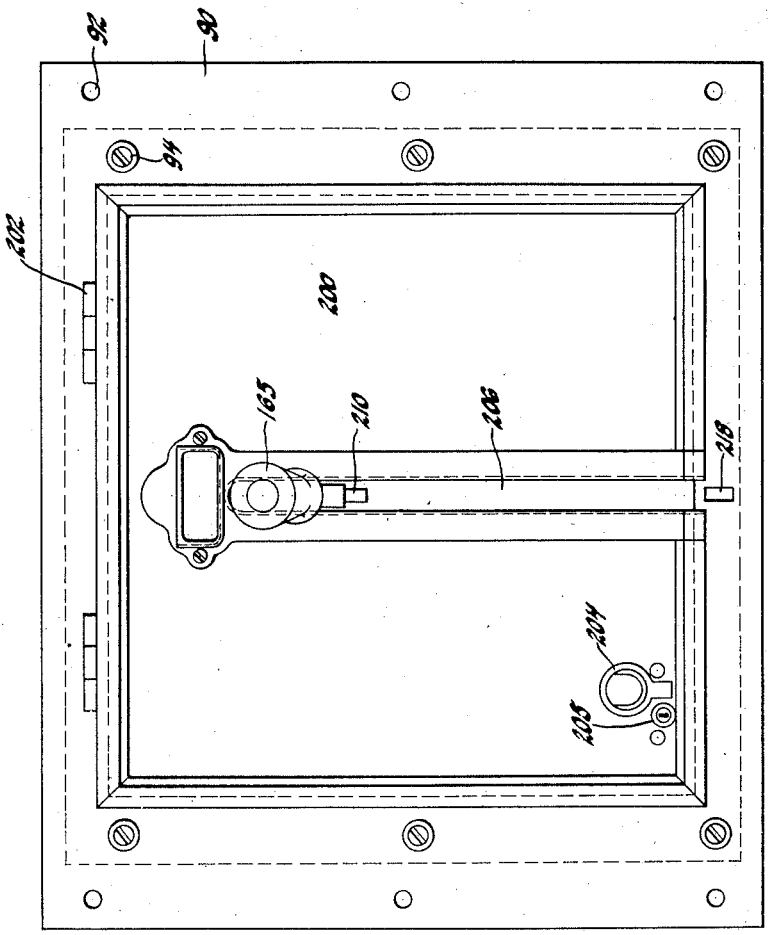
Fig. 5 is a front view of the switch of Fig. 4, the steel front and handle being shown particularly.

In Figs. 1a and 1b, a frame has been shown by way of example. The frame includes a plurality of box-like frame sections A, B, C and D, each edge of each section comprising an angle member 37, the angles being joined by welding, or by bolts, clamps, etc. as desired, a corner including three angles 37, as shown in Fig. 1b.

In the construction shown, the switchboard is of the free-standing, or self supporting type, but the switchboard may include only the front and some of the side angles, the board then being secured to a building wall or part for support.

The various sections are secured to one another by bolts, clamps, etc. as desired, and are relatively interchangeable and removable, as can be readily seen.

Further, the vertical front angles are drilled on unit centers, as at 20, previously described, for cooperation with the steel fronts of the switches and with the filler plates.

The angles may also be drilled as at 38 to enable steel enclosing plates (not shown) to be secured to the frame. These plates may be arranged, to enclose the switchboard completely, if desired, or to form partial enclosures. Certain of the plates may be formed as hinged doors to permit authorized persons entering the switch board, for any desired purpose.

Near the upper ends of the sections, other angles 39 may be provided, these angles supporting horizontal plates (not shown) which form the pull box 34 at the upper end of the switchboard.

*The switches*

Two sizes of switches are illustrated in the drawings and they will now be described. Figs. 2 and 3 show diagrammatically operating mechanism, common to all of the switches; Figs. 4–11 show a 200 Amp. switch; and Figs. 12 and 13 show a 1200 Amp. switch. Of course, it will be understood that other sizes may be provided, all of which are mere variations of those illustrated.

*Operating mechanism.*

Referring first to Figs. 2 and 3, which show the operating mechanism, diagrammatically, it will be seen that the stationary part of the switch includes a slate panel 40 having separated contacts 42 and 44 adapted to be connected respectively to a bus bar 46 and a load cable 48. The stationary contacts 42—44 are to be engaged by the separated contacts 50 and 52 on the movably mounted slate panel 54, the movable contacts being connected to each other thru a fuse 56, preferably of the cartridge type, the fuse being removably mounted in fuse clips 58 of well known form.

To reciprocate, movable panels 54 towards and away from the stationary panel, there is provided a triangular plate 60 pivotally mounted at 62 on the side wall (not shown) of the switch casing, the pivot 62 also serving as a pivotal mounting for the handle 64 by means of which the plate 60 may be rotated on its pivot. A link 66, pivotally connected to the plate and to the movable panel serves to transfer the motion of the plate to the panel, as the plate moves in response to the movement of the handle.

It will be clearly understood that the fuses 56 may be omitted if desired, and replaced by a solid strap connection, in which case the switch will be of the unfused type.

Further, the panels 40 and 54 may be of any suitable insulating material other than slate, if desired.

When the switch is to be closed, the handle 64 is grasped and the trigger or catch 68 released from the door forming part of the steel front 70 of the switch. Then the handle is pulled up and by virtue of its engagement with the edge of a slot 71 formed in a flange 72 formed as part of the plate 60, the handle will rotate the plate and will move the panel 54 towards the stationary panel, until contacts 50, 52, 42, 44 engage, as shown.

When the switch is to be moved to circuit open position, handle 64 is pulled downwardly, so that the link 74 pivotally connected thereto, will tend to compress a spring 76 which is disposed between a lug 73 and a head 78 on the link 74. Such compression will continue until the spring which is of the compression type, acts to force the plate 60 downwardly and to disengage the contacts 50—52—42—44 from one another, the spring acting suddenly for quick break action.

Switches constructed in accordance with the foregoing present several important advantages over other forms of switches. First of all, the switch is of the double break type, that is to say, it interrupts the circuit at two points, as contrasted with single break switches, which interrupt the circuit as but one point. Secondly, the switch is much more compact than is a single break switch, this being due to the fact that the length of the arc is diminished. In fact the switch disclosed is so compact that it requires but little more space than is required to accommodate the fuses used in the circuits. Thirdly, the contacts of the switch illustrated are of the blade and jaw type, which is a far more satisfactory type than brush type contacts commonly used on switches of this character. It will be seen that since the arc is broken in two places, the length of each arc is less than that in a single break switch, and the arc breaking distance is therefore less.

Further, the switch is a quick break switch, this construction being more satisfactory than switches which interrupt the circuit slowly, or no more rapidly than the operator can move the switch parts. Further, the trigger 68 is provided to prevent the switch from being thrown into the "on" position accidentally or unintentionally.

It will also be noted that the quick break spring 76 is of the compression type, this being preferable to the tension type, since it has a longer life than a tension type spring. Further, it will be noted that even if spring 76 be broken, the switch may be operated. For instance, the switch may be closed readily, since the spring has no function on switch closing, as described above; the switch may be opened readily, tho the spring be broken, by virtue of the fact that the handle 64 when moved downwardly, for switch opening, will engage a lug 80 formed as part of the plate 60 and will swing the plate backwards, tho, to be sure, without any quick break action.

It will also be observed that the fuses are moved, together with switch parts, for switching action, this construction effecting certain space economies. Further, when the switch is in the "off" position, the fuses are entirely disconnected from the live supply contacts 44 and there is, accordingly, no danger of feedbacks causing damage to the person replacing the fuses. Further, the slate panel 54 acts as a barrier between the live supply contacts 44 and the fuses, as they are being replaced, and also as a barrier between the live contacts and the person replacing the fuse, thus protecting him from danger of accidental contact with live parts. Further, since the fuse clips are "dead" when exposed for fuse replacement, it is feasible to connect any side of the circuit to any of the contacts 42—44, without ill effect, as will readily be observed, thus permitting either side of the switch being connected to the line or the load side, without any ill effects.

It will also be noted that the switch parts, especially the handle, are mounted that the influence of gravity tends to open and maintain open the switch. Accordingly, there will be little danger of falling objects and parts closing the switch when such closing is not desirable. Further, the trigger 68 prevents accidental or unintentional closing of the switch, as can be seen.

Having disclosed and described the operating parts of the switch, those embodiments of the switch that are specifically disclosed will now be described.

*The 200 Amp. switch (Figs. 4–11) casing and stationary parts*

Referring to Figs. 4–11 which show a 200 Amp. switch in detail, it will be seen that the switch includes a steel front 90, adapted to be secured to a suitable frame by bolts (not shown) passed thru the mounting holes 92 provided in the steel front. Secured to the latter, by screw bolts 94, are a pair of sheet steel side plates 96 which form the sides of the switch casing, and secured to inturned flanges 97 of these plates by bolts 98 is a slate panel which forms the support for the stationary contacts and for the bus bar and load cable connections, to be described in detail later. The top of the switch casing is or may be left open, while the bottom is partially closed by a plate 102 of insulating material, secured to outturned flanges 103 of the side plates 96 by bolts 104.

As mentioned above, the slate panel 100 supports the live parts of the switch, these including a plurality of (six) female contacts 106 secured to the panel by bolts 108 which project thru the panel to behind the switch, the projecting ends of one row (three) of the bolts being connected to the bus bars (not shown) by nuts 110, and the projecting ends of the other row (three) of the bolts being connected to load cables (not shown) by the terminals 112 held in place by nuts 114.

It will be observed that the live bolts 108 are shielded from accidental contact by angle strips 116 of insulating material, these strips each having one flange clamped between the slate panel 100 and a side plate flange 97 by the bolts 98, and having one flange disposed near, and shielding the bolts 108, as shown in Fig. 4. Further, the heads of the grounded bolts 98 are shielded from accidental contact with live parts inside the switch casing by small cups 118 of insulating material, these cups being closed by discs 118a, also of insulation.

It will also be observed from Fig. 11, that if desired, each of the contacts 106 may be enclosed in a tube 119 of insulating material, secured to the stationary panel, by means not shown, this tube serving to smother any arc that may be drawn from the free end of the contact 106. Of course, the tube may be provided on the male contact that is to engage the female contact 106, if desired, and other refinements, in the construction or positioning of the arc smothering device may be effected, as can readily be understood.

So far there has been described the casing and the stationary parts of the switch. Disposed within the casing, for cooperating with these stationary parts are the movable parts of the switch, and these, together with their bearing and guiding means, their operating means, and their interlocking means will now be described.

Movable parts

The movable parts of the switch include a slate panel 120 having secured thereto by screws 121 a number of (six) male contacts 122 adapted to cooperate with the stationary female contacts 106 above described. The male contacts project thru slots in the horizontal edges of the panel to the front side thereof and terminate in fuse clips 124 shaped to receive blades of cartridge fuses which are adapted to be mounted on the panel in the clips, and each fuse of which is adapted to connect, electrically one of the male contacts with the one immediately beneath it.

Each of the clips is provided with a loop of spring wire 126 secured to these clips by small bolts 128, these loops serving to assist in retaining fuses in place in the clips, and being adapted to be swung on the bolts 128 as an axis, above (or below as the case may be) the clips when insertion or removal of a fuse is to be effected.

The movable panel, with all of the parts mounted thereon, namely, the male contacts, the fuse clips, the fuses, etc., is moved towards and away from the stationary panel bodily in a straight line path which is perpendicular to the plane of the panels, until contacts 122 engage or disengage stationary contacts 106, as desired. All of the contacts should engage and disengage simultaneously and without hesitation or lateral shifting. It therefore appears necessary to provide means to support the movable panel while the contacts are in or out of engagement and while it is being moved towards and away from the stationary panel, the supporting means being so constructed as to guide the movable panel in its movement so that a straight line path will be transversed by the latter, the supporting means also being so constructed that they will offer little or no friction to the panel as it is being moved. With this in mind the bearing means disclosed has been provided, and the same will now be described.

Movable parts bearings

Secured to the rear surface of the movable panel by bolts 130, are horizontally disposed arcuate members 132 having forwardly projecting portions 133 to which are secured members 134 which form major parts of the movable panel supports. Each of the two members 134 is more or less trough shaped in cross section to cooperate with outwardly extruded trough-shaped formations 136 of the steel sides 96, separated by a slot 137, to form a race for a plurality of (two) steel bearing balls 138, all of which form the supports and bearings for the movable panel. The ends of the members 134 are turned inwardly as at 140 to prevent the balls 138 from dropping out of the races in which they rotate and freely move. Further, the forward ends of the members 134 are provided with lugs 142 for purposes to be described later.

In order to shield the bearing parts, which are grounded thru the steel sides and front of the switch and thru the frame which supports the switch, from accidental contact with the live parts of the switch, the ends of the bolts 130 are covered by insulating cups 144 like those shown at 118—118a, and to the rear surface of the movable panel there is secured by the bolts 130 a steel strap 146 to which is secured by screws 148 a sheet of self sustaining insulating material 150, the latter having rearwardly turned ends 152, as shown. The sheet 150, it will be observed, occupies the space between the male contacts 122, and completely shields all of the movable bearing parts from the live contacts and parts.

The bearing and supporting construction, including as it does, little more than full-floating hardened steel bearing balls, is inexpensive of manufacture, facile of assembly, and very efficient of operation, besides being extremely durable and difficult of maloperation. This construction is far more satisfactory than constructions employing guide rods since the latter, if made loose fitting and flexible, for purposes of economy, are unsatisfactory of operation, and if made tight fitting and rigid, for alignment purposes, are expensive to make, besides offering much friction to the moving parts. Further, this construction being as satisfactory as it is inexpensive, permits of the practical manufacture of double break, blade and jaw contact switches, as contrasted with single break, blade and jaw contacts switches, or double break, brush contact switches.

The bearing balls, being spherical, automatically align the guides, besides offering little friction to their operation, and at the same time, are flexible enough to permit the contacts to mate properly, that is quickly and securely. Further, this construction effects a "floating" contact action; that is to say, the contacts securely engage one another, regardless of slight variations in the position of the supports and the guiding and bearing means. Further, the construction being frictionless, permits quick and unhesitating switching action, as contrasted, with guide rod constructions which are highly frictional, and which therefore, prevent quick switching.

In fact, the ball bearing guide construction may be said to have made practical the use of double break switches, so long considered desirable.

In Fig. 20 there is disclosed a modified construction, one in which the reciprocating panel 120 is removable from the bearing and guide parts, together with the fuses carried thereby, and in this modification, the fuse clips are shown as readily detachable from the panel 120 so that they may be replaced by other fuse clips when other sizes of fuses are to be used, and this construction may incorporate the adjustable fuse receiving clips of application Ser. No. 353,343, above mentioned.

In the form of Fig. 20 it will be seen that both the arcuate member 132 and the strap 146 are rigidly or even permanently secured to the member 134. The arcuate member 132 and the strap 146 are provided with corrugations 132a and 146a which serve to space parts 132 and 146 from each other, these parts being secured to each other by their securement to the member 134 and also by the screws 130a, these, unlike screws 130 of Fig. 8, not being threaded into or thru panel 120.

The panel 120 is secured to the strap 132 by a plurality of screws 131 and these screws have the heads exposed on the fused side of the panel so that the panel, together with the fuses thereon, may be removed from the switch without dismantling the latter. Each panel 120 is provided with fuse clips 124a, and in the form of Fig. 20 the fuse clips are removably secured to the panel by screws 125 secured to the panel 120 and having their heads exposed to the fused side of the panel 120. Fuse clips 124a may be removed from the panel 120 and replaced by others of different size and different spacings to receive different fuses.

Accordingly, it will be seen that in the form of Fig. 20, a switch may be altered, without dismantling, simply by removing a panel 120 and replacing it by another having different sized fuses thereon. Further, in the event of injury to or breakage of any of the parts forming part of the panel 120, the same may be replaced, without dismantling the switch, merely by removing the panel 120 and replacing it by another. In order to move the movable panel towards the stationary panel, switch operating means have been provided and the same will now be described.

Operating mechanism

The means for projecting or retracting the movable panel 120 on its bearings and guides includes a triangular plate 160 pivotally mounted on bolts 162 threadedly secured to squared bearings 164 welded or riveted to the steel sides 96. The bolts 162 and bearings 164 also serve as pivotal mountings for a switch moving handle 165, which includes a steel strap 166 having rearwardly projecting ends 167 thru which the bolts 162 are passed, the remainder of the handle 165 being formed of a shank 168, bolted to the strap 166 at 169, and provided with a tapped hole 170 into which is threaded a stud formed as part of the wooden hand grip 172.

A link 174, pivotally connected to the plate 160 by a pin 176, and to the bearing and guide member 134 by a bolt 178 transfers motion from the plate 160 to the member 134, and accordingly, to the moving panel 120 and its associated parts.

The plates 160 are provided with flanges 180 having slots 182 thru which the strap ends 167 project, and the upper end lower edges of these slots, marked 183 and 184, serve as abutments against which the strap ends 167 may be moved so as to transfer motion from the strap ends and the handle to the plates.

The quick break mechanism for the switch includes links 186, pivotally connected to the strap ends 167 at 188, and projecting upwardly thru holes in lugs 190 formed from the plates 160, the links being provided at their upper ends with thin plates 192 held on the links by cotter pins 193. Coiled compression springs 194 are disposed around the links 186 and between the plate lugs 190 and the thin plates 192, these springs serving to force the plates 160 rapidly down around their pivots 162 when they are compressed sufficiently by the thin plates 192, as the handle 165 is moved downwardly for switch opening.

It will be observed that the springs are totally enclosed by the steel sides 96, the plates 160 and their flanges 180, and by the ends 140 of the bearing members 134, and that they are at some little distance laterally, as well as longitudinally, from the live parts on the panels. Accordingly, in the event one or both of the springs is broken, as often occurs, it will be almost impossible for the broken spring parts to come in contact with any of the live parts, thus causing short circuits, or other injurious disturbances. Further, broken spring parts can not lodge in any of the guides or ball races, nor between any other moving part of the switch in such a way as to prevent operation of the switch.

In order to prevent undesired operation of the switch, and to prevent undesirable access into the switch casing, safety interlocking means for the switch have been provided and the same will now be described.

Interlocking means

The various functions of the interlocking means are as follows:

(a) to prevent access into the casing when the switch is on.

(b) to prevent closing of the switch when the casing is open, except when testing of the switch is to be performed;

(c) to prevent accidental closing of the switch;

(d) to lock the switch in open position, against closing by unauthorized persons;

(e) to insure complete movement of switch to open position when partial movement thereto has been effected.

(f) to prevent access into the casing at all times, except by duly authorized persons; and the means for carrying out these various functions will now be described in detail.

The steel front 90 is provided with a door 200 hingedly mounted at or in the upper edge of a large opening in the steel front. Near the lower edge of the door is a spring latch (not shown) which can be opened by a latch handle 204, controlled by a key operable lock 205, whereby the door may be locked in place, thus debarring the interior of the switch casing against access by all except duly authorized persons.

The door is provided with a long and narrow central slot 206 thru which the handle 165 projects, and the slot extends to the bottom edge of the door so that the handle can be moved below the latter edge, permitting the door to be swung forwardly and upwardly on its hinge, and exposing the interior of the switch casing.

The handle 165 or more specifically, the shank 168 is undercut to provide a groove 208 in which is disposed a trigger or catch 210, there being a pin 212 by means of which the trigger is pivotally suspended in the shank. A coiled compression spring 214 in the shank operates to force the trigger toward the steel front 90 so that the trigger hook 216 catches in a slot 218 in the steel front. The slot 218 being in line with and slightly below the slot 206 in the door. A stop pin 220 is provided in the shank to prevent the trigger from being forced too far outwardly. The trigger is further provided with an aperture 222 thru which the hasp of a padlock may be passed. The purpose of the trigger will be explained in detail below.

On the steel sides 96, inside the casing, there are pivotally mounted, at 226, two interlocking members 228, each of which is provided with a hooked, rearwardly extending end 230, and with a forwardly extending nose portion 232, the latter being so disposed as to be engaged by the door 200 when the latter is moved to its closing position. The hooks 230 are adapted to engage the lugs 142 formed on the upper ends of the guide members 134, previously described, and thus subject the latter, and the parts connected thereto to an interlocking relation with the door. Springs 234, connecting the members 228 with the steel sides, tend to swing these members on their pivots 226 so that hooks 230 will be in line to receive and lock in place the lugs 142 on the guides.

The interlocking functions described above are carried out in the following manner:

(a) When the switch is on, handle 165 is up, and the enlarged hand grip 172 is so near the door that the latter cannot be opened more than a very small amount, not enough to permit access into the casing. The handle 165 must be moved downwardly to switch "off" position, before door 200 can be moved to open position.

(b) When the door is open, and the interior of the casing is accessible, hooks 230 will engage the lugs 142 of the previously retracted guide members 134, and will prevent the latter, and the movable panel from being moved to switch on position. Until the door is closed, this interlock is effective, as can readily be seen. Of course, if the operator of the switch is determined to close the latter, even with the door open, he can do so by jamming back the two interlock members 228 so as to release lugs 142, but it will be seen that three hands, or other extraordinary means are necessary for this purpose. Such action is not ordinarily contemplated, tho it may be often necessary for switch testing purposes.

Further, if the switch testing is to be effected, it is possible to close the switch, even with the door open merely by removing the wooden hand grip 172 from the shank, whereupon the door can be swung open, with the switch closed or open.

(c) The trigger 210, normally engaged with the steel front, prevents accidental raising of the handle 165 and accidental closing of the switch.

(d) Further, with the hasp of a padlock passed thru trigger hole 222, closing of the switch, except by one who can remove the padlock, is prevented.

(e) The weight of the handle 165 tends to open the switch, this tendency being resisted by the gripping action of the separated parts of the contacts 106. The switch will not open of its own accord, due to the gripping action just mentioned, and due to the inertia of the parts, but when partial movement to switch open position has been effected, the gripping action will be removed and the inertia of the then moving parts, plus the influence of gravity on the handle will continue the movement until full movement has taken place.

(f) Access into the casing, may of course, be under the control of the person having the key to lock 205.

The 1200 Amp. switch (Figs. 12 and 13)

In general, the 1200 Amp. switch is very much like the 200 Amp. switch, including as it does, a casing, a stationary panel having contacts and connection devices, a movable panel having contacts and fuse clips, bearing and guide devices, operating means, interlock means, etc. The essential differences between switches reside in the construction (a) of the fuse clips; (b) of the switch operating mechanism; (c) of the bearing and guide construction; and (d) the contact construction. The details of construction will now be described specifically.

The fuse clips 240 of the 1200 Amp. switch are longer than those commonly used, being so designed that each clip will receive the blades of two fuses 242 standing adjacent each other, one in front of the other. The two parts of each clip are connected by thumb screws 244 which bind the fuses in place, when rotated to move the clip parts towards each other. This construction is very economical of space and facile of manipulation, besides begin electrically and mechanically efficient, being a decided improvement over previous constructions wherein larger fuses were used. Further, this construction connects two fuses in multiple and therefore permits two 600 Amp. fuses to be used in place of one larger and bulkier 1200 Amp. fuse.

The operating mechanism for the 1200 Amp. switch is in general, very much like that of the 200 Amp. switch. However, the interlock between the operating mechanism and the interlock member 228 is effected by the interengagement of the hooks 230 with the ends of the flanges 180 formed on the triangular operating plates 160, as contrasted with the 200 Amp. switch interlock, wherein the lug 142 is used. This change is merely one of design, being necessitated by the fact that in the 1200 Amp. switch there is a considerable distance between the front of the switch and the forward end of the bearing member 134, when the latter is in its switch open position, the distance being taken up by the elongated fuse clips 240.

The bearing and guide construction includes all of the parts and devices used on the 200 Amp. switch, but is supplemented by an additional support, described as follows. Rigidly connected to the movable panel 120 and projecting forwardly therefrom are a plurality of (three) fiber fuse carrier supports 250, one of which is beneath each of the lower fuse clips. The supports are secured to the panel by screws 252 and to the clips by screws 254 and are adapted to ride on a roller shaft 256 which extends from side to side of the casing. The ends of the shaft 256 are provided with ball bearings 258 fixed in bearing plates 260 secured to the steel sides. This construction supplements the bearing-guide construction 134—136—138, and is particularly desirable for heavy duty switches.

The contacts for the 1200 Amp. switch are substantially like those of the 200 Amp. switch but differ in that they are doubled, that is to say, for a 3-pole double break switch, there are twelve male contacts instead of six. Further, between the contacts are barriers 262 of insulation, which shield the live parts more effectively. Some of the barriers are secured to the stationary panel 100 and others to the movable panel 120, as can be seen, to form an effective interlocking barrier between the parts of opposite polarity.

Multiple operation of switches (Figs. 14-19)

(a) Tandem vertical.—It often is desirable to connect two switches which are in the same panel, one above the other, in such a manner that both may be operated as one, and from one handle. A construction provided for this purpose is shown in Fig. 14 and will now be described. The steel sides 270 of the switches to be operated in this manner are slotted as at 272, and thru the slots project pins 274 secured to the triangular operating plates (not shown) which are like those at 180, Fig. 7. The pins 274 are connected by a link 276, and it will be seen that as the lower switch is moved by its handle 278, the upper switch is moved in the same direction. Thus, both switches may be opened together and closed together, with but one operating handle.

(b) *Tandem horizontal.*—Two switches, which are side by side, may be connected to operate as one, in the manner shown in Figs. 15 and 16. The shanks 280 of the handles of switches 282 and 283 are connected by a strap 284 having a centrally disposed hand grip 285, and when the latter is raised or lowered, both shanks 280 are similarly moved, simultaneously, and in the same direction.

(c) *Interlock.*—Two switches, disposed one above the other may be connected to each other, so that one cannot be closed until the other is opened and vice versa. Further, the interlock prevents both switches from being "on" at the same time. A construction for this purpose is shown in Figs. 17–19. It will be seen that switches 290 and 291 have steel sides 292 and 293 which are slotted, as at 294 and 295, and through these slots project pins 296 and 297 connected by a link 298 having pin received L shaped slots 299 and 300, and having a pivotal mounting at 301.

When the handle 302 is lowered to open switch 290, pin 296 will ride down in slot 294 and will cause the upper upper end of link 298 to move to the right. Thereupon, the lower end of link 298 will move to the left, permitting pin 297 to move upwardly and permitting handle 303 to be raised for switch closing. Until switch 290 is opened, pin 297 is locked against movement, and accordingly, switch 291 is locked against closing. Of course, a reverse operating, using switch 291 as the switch to be opened, and switch 290 as the one to be closed, is possible as can be seen.

Further, both switches can be left open, simply by opening one, and refraining from closing the other.

It will be seen, therefore, that there has been provided a standardized switchboard and switch construction and a novel form of switch, capable for use with switchboards of the type disclosed, and permitting various and interchangeable combinations of switches, of various polarities capacities, and voltages, the switchboard being of neat appearance, regardless of the particular combination of switches used.

Modifications and refinements in the construction of switches and the switchboard have been disclosed in Figs. 21 to 33 inclusive and the same will now be described.

Referring to Fig. 21, which is intended to resemble Fig. 7, it will be seen that a quick make and break mechanism for the movable panel 320 has been provided, the same including a two-piece rod which includes parts 321 and 322, the former being pivoted to the side wall of the switch casing at 323, and the latter being pivoted to the panel 320 at 324, both of the parts being shouldered at 325 and 326, there being a coiled compression spring 327 surrounding the two part rod.

It will be seen that when the movable panel 320 is moved towards the stationary panel shown in dotted lines at 328, parts 321 and 322 move relatively to each other, the distance between 323 and 324 being lessened, and spring 327 is compressed. As the switch moves over center, the compression on spring 327 is relieved and the latter then expands quickly and drives the switch panel 320 towards the panel 328 for a quick make action. Similarly, when the panel 320 is partially withdrawn, the coiled spring 327 will pull it away from the panel 328, for a quick break action as will be readily observed.

In Figs. 22 and 23 there is disclosed a switch which is economical of horizontal space, although extravagant of vertical space. In this form the movable panel 340 slides upon an inclined runway 341, there being the usual ball and slot construction (not indicated) to form guide and supporting means for the movable panel. It will be seen that the movable panel, tho at all times vertical, moves in a path at an acute angle to the base of the switch, unlike the forms previously described where the path of movement of the movable panel was parallel to the base of the switch.

It will be observed that a switch of this character, wherein the movable panel slides at an angle to the stationary panel, is practical if a frictionless guide and bearing construction such as is disclosed, be used, but if a high friction support and guide construction, such as guide rods, be used, a switch of this character cannot be made practical.

In Fig. 24 the guide and bearing construction for the movable panel 350 includes a bar 351 secured to the side wall 352 of the switch, there being a channel member 353 secured to the movable panel in any desired manner. It will be understood that the bar may be provided on the movable panel and the channel on the casing 352 as desired, the important point being that the movable panel 350 is supported and guided from the side wall of the switch casing and not from guide rods etc. otherwise mounted.

In Figs. 25 and 26 the support for the movable panel 360 includes a roller 361 mounted on a bolt 362 and sliding on the slotted wall 363 of the switch casing, the rollers 361 rolling on the lower edge 364 of the slot. In this form also it will be understood that the rollers may be provided on the casing to roll in a groove in the channel 360, if desired.

Figs. 27 to 29 show a switch board section E provided with switches 370, 371 and 372, the switches 370 and 371 being mechanically connected to each other for vertical tandem operation, the switch 372 being free of mechanical connection with respect to the other switches. It will be seen that the switches are electrically connected to each other thru the vertical buses 373—374—375, and it will also be seen that the switches of the section shown may be connected to switches of adjacent sections by the horizontal buses 376, 377 and 378, connected to the vertical buses 373, 374 and 375. Supply cables 380, disposed within the pull box 381 lead to the switches 370 and 371, and a load cable 382 disposed within the cable trench 383 is connected to the switch 372.

Figure 30:
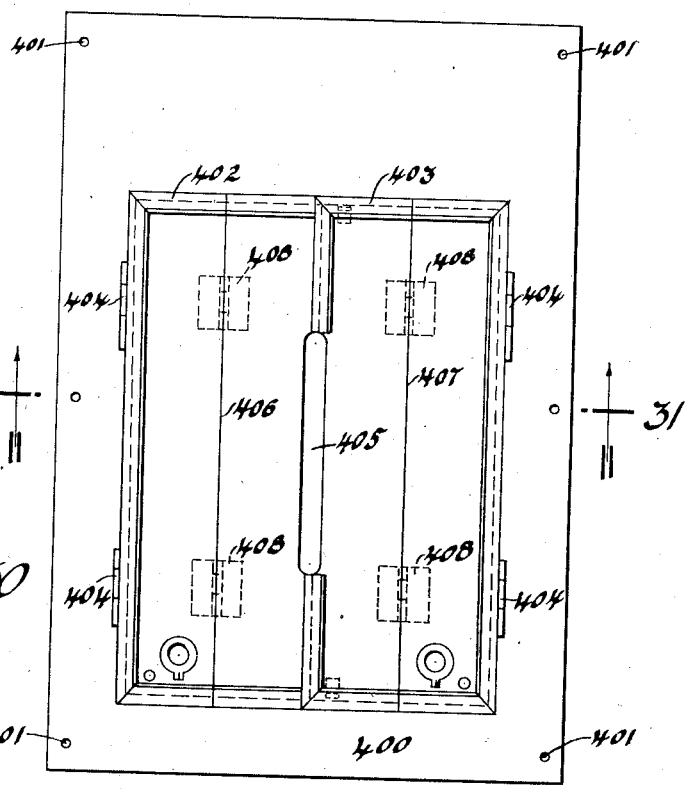
Fig. 30 shows a front plate for use with a circuit breaker of a type not shown.
Figure 31:
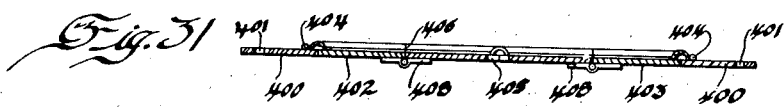
Fig. 31 is a section on the line 31—31 of Fig. 30.

Figs. 30 and 31 show a steel front for use with a certain form of circuit breaker, the latter not being shown since it forms no part of the invention. The steel front of these figures includes a plate 400 having the usual mounting holes 401 and having a large central aperture closed by means of the doors 402 and 403, hinged to the plate 400 at 404. The meeting line of the doors 402—403, is cut away to form a slot 405 thru which projects and in which moves the handle of the circuit breaker. Further, each of the doors 402, 403 is split on the lines 406—407 so that each door may include two sections movable with respect to each other on the inside hinges 408, disposed as shown. It will be seen that the steel front of this modification is different from those previously disclosed in that the hinged door is of two parts, each part being further divided into two sub-parts, for purposes which need not be described here, but which can be readily observed when the device is in use.

Figure 32:
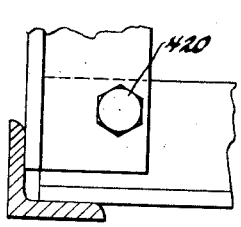
Fig. 32 is a top plan view of a lower corner of the frame showing a leveling bolt.
Figure 33:
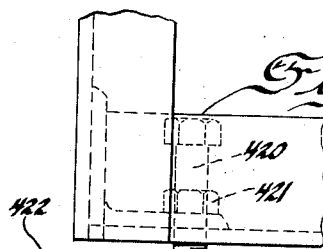
Fig. 33 is a side view of the corner of Fig. 32.

In Figs. 32 and 33 there is disclosed a leveling bolt 420 provided with a locking nut 421 and adapted to engage the uneven floor 422, to level the adjacent corner of the frame with respect to other corners of the frame, not shown.

Now having described the invention, and the preferred embodiment thereof, it is to be understood that the said invention is to be limited, not to the specific details herein set forth, but only by the scope of the claims which follow:

What I claim is:

1. In a double break switch, a panel having a pair of aligned contacts on one side thereof and having a pair of aligned fuse clips on the other side electrically connected to the contacts, cartridge fuses electrically connecting the clips of the pair, each of the clips comprising two separated, parallel, jaw portions between which blades of the fuses are inserted, the jaws being long enough to receive between them simultaneously the blades of two separate cartridge fuses.

2. In a switch, a stationary panel and a movable panel in front thereof and parallel thereto and movable in a path substantially perpendicular thereto, said panels having mating contacts on their parallel facing sides, a fuse on the front of said movable panel for connecting the latter's contacts, a shield in front of said movable panel and means in front of said movable panel and behind said shield and having a handle portion in front of said shield for moving said movable panel towards and away from the stationary panel along said path to engage and disengage the contacts.

3. In a switch, a front covering plate, a stationary panel having forwardly projecting contacts, a movable panel having rearwardly projecting contacts adapted to engage the stationary panel contacts, a fuse on the forward surface of the movable panel and connecting the movable panel contacts, and means between the front covering plate and the fuse side of the movable panel for moving the latter, said means comprising a pivotally mounted operating plate, a pivotally mounted handle adapted to engage said plate so as to rotate the latter on its pivotal mounting and a link connecting the plate and the movable panel, there being a quick break means for said operating means comprising a headed link pivotally connected to the handle and surrounded by a coiled compression spring disposed between the headed end of the link and a part of the operating plate.

4. In a switch, a front covering plate, a stationary panel having forwardly projecting contacts, a movable panel having rearwardly projecting contacts adapted to engage the stationary panel contacts, a fuse on the forward surface of the movable panel and connecting the movable panel contacts, and means between the front covering plate and the fuse side of the movable panel for moving the latter, said means comprising a pivotally mounted operating plate, a pivotally mounted handle adapted to engage said plate so as to rotate the latter on its pivotal mounting and a link connecting the plate and the movable panel, the pivotal mounting of the operating plate and the handle being such that the weight of the handle tends to move the parts to switch open position.

5. A switch comprising a stationary panel and a movable panel, each having contacts thereon, a fuse on said movable panel for connecting the latter's contacts, and means to move said movable panel towards and away from the stationary panel to engage and disengage the contacts, and bearing and guide means for the movable panel comprising a pair of trough-like bearing members on the side edges of and secured to the movable panel which cooperate with aligned trough-like formations on the side walls of the switch to form races for loosely floating bearing balls disposed in and between the troughs.

6. In a switch, a front covering plate, a stationary panel having forwardly projecting contacts, a movable panel having rearwardly projecting contacts adapted to engage the stationary panel contacts, a fuse on the forward surface of the movable panel and connecting the movable panel contacts, and means between the front covering plate and the fuse side of the movable panel for moving the latter, said means comprising a pivotally mounted operating plate, a pivotally mounted handle adapted to engage said plate so as to rotate the latter on its pivotal mounting and a link connecting the plate and the movable panel, said handle projecting thru the front covering plate.

7. In a switch, a front covering plate, a stationary panel having forwardly projecting contacts, a movable panel having rearwardly projecting contacts adapted to engage the stationary panel contacts, a fuse on the forward surface of the movable panel and connecting the movable panel contacts, and means between the front covering plate and the fuse side of the movable panel for moving the latter, said means comprising a pivotally mounted operating plate, a pivotally mounted handle adapted to engage said plate so as to rotate the latter on its pivotal mounting and a link connecting the plate and the movable panel, said handle projecting thru the front covering plate, and being provided with a releasable catch means mounted to engage the front covering plate and to prevent movement of the handle.

8. In a switch, a front covering plate, a stationary panel having forwardly projecting contacts, a movable panel having rearwardly projecting contacts adapted to engage the stationary panel contacts, a fuse on the forward surface of the movable panel and connecting the movable panel contacts, and means between the front covering plate and the fuse side of the movable panel for moving the latter, said means comprising a pivotally mounted operating plate, a pivotally mounted handle adapted to engage said plate so as to rotate the latter on its pivotal mounting and a link connecting the plate and the movable panel, there being a quick break means connected to the handle and surrounded by a coiled compression spring disposed between the headed end of the link and a part of the operating plate, the spring being substantially completely surrounded by the operating plate and the parts associated therewith so that, in the event of the spring breaking, broken parts thereof cannot readily come in contact with live current carrying parts of the switch.

9. A switch comprising a stationary panel and a movable panel, each having contacts thereon, a fuse on said movable panel for connecting the latter's contacts, and means to move said movable panel towards and away from the stationary panel to engage and disengage the contacts, and bearing and guide means for the movable panel comprising a pair of trough-like bearing members on the side edges of and secured to the movable panel which cooperate with aligned trough like formations on the side walls of the switch to form races for loosely floating bearing balls disposed in and between the troughs, the ends of the members being turned inwardly to close the ends of the races.

10. In a double break switch having contacts of the blade and jaw type, the combination of a stationary panel, a movable panel, and bearing and guide means for the movable panel comprising a pair of trough-like bearing members on the side edges of and secured to the movable panel, which cooperate with aligned trough-like formations on the side walls of the switch casing to form races for loosely floating bearing balls disposed in and between the troughs.

11. In a double break switch having contacts of the blade and jaw type, the combination of a stationary panel, a movable panel, and bearing and guide means for the movable panel comprising a pair of trough-like bearing members on the side edges of and secured to the movable panel, which cooperate with aligned trough-like formations on the side walls of the switch to form races for loosely floating bearing balls disposed in and between the troughs, the ends of the members being turned inwardly to close the ends of the races.

12. In a switch having a stationary panel and a movable panel, a bearing member secured to the movable panel by means having manipulating portions accessible from the front of the switch, the bearing member having portions slidably mounted on the side wall of the switch casing.

13. In a switch having a stationary panel and a movable panel, a bearing member secured to the movable panel by means having manipulating portions accessible from the front of the switch, the bearing member having portions slidably mounted on the side wall of the switch casing, and fuse clips removably mounted on the front side of the movable panel.

14. In a switch having a stationary panel and a movable panel, quick make and break mechanism, including a rod having two relatively movable parts, one of which is pivoted to the switch casing and the other of which is pivoted to the movable panel, the parts having shoulders between which is disposed a rod surrounding coiled compression spring.

15. In a casing enclosed switch having a stationary panel and a movable panel, runways in the side walls of the casing, and bearing members forming part of the movable panel and slidable in runways to guide and support the movable panel in its switching movement.

16. In a casing enclosed switch having a stationary panel and a movable panel, runways in the side walls of the casing, and bearing members forming part of the movable panel and slidable in runways to guide and support the movable panel in its switching movement, the runway being at an acute angle with respect to the base of the switch.

17. In a casing enclosed switch having a stationary panel and a movable panel, runways in the side walls of the casing, and frictionless bearing members forming part of the movable panel and slidable in the runway to guide and support the movable panel in its switching movement.

18. In a switch, a base, contacts on said base, parallel walls extending perpendicular to said base, guiding means on said walls, a movable switch member having guiding means cooperating with the first mentioned guiding means whereby the movable members may be supported thereby and guided into and out of contact with said stationary members.

19. In a switch, a movable part, and means for moving the movable part, comprising a pivotally mounted operating plate, a pivotally mounted handle adapted to engage said plate so as to rotate the latter on its pivotal mounting, and a link connecting the plate and the movable part, there being a quick break means for said operating means comprising a headed link pivotally connected to the handle and surrounding by a coiled compression spring disposed between the headed end of the link and a part of the operating plate.

20. In a switch, a movable part, and means for moving the movable part, comprising a pivotally mounted operating plate, a pivotally mounted handle adapted to engage said plate so as to rotate the latter on its pivotal mounting and a link connecting the plate and the movable part, the pivotal mounting of the operating plate and of the handle being such that the weight of the handle tends to move the part to switch open position.

21. In a switch, fixed contacts, movable contacts, a support therefor, means for moving said movable contacts to and from said fixed contacts, and means providing frictionless and wear-compensating bearings for said movable contacts to facilitate contact making and breaking and to maintain alignment of the contacts, regardless of wear, said means including ball bearings disposed in races between said support for said movable contacts and fixed parts of the switch.

22. In a switch, a movable part, a covering plate, and means for moving said movable part, said means comprising a pivotally mounted operating plate, a pivotally mounted handle adapted to engage said operating plate so as to rotate the latter on its pivotal mounting, and a link connecting the operating plate and the movable part, said handle projecting thru the covering plate.

23. In a switch, a movable part, a covering plate, and means for moving said movable part, said means comprising a pivotally mounted operating plate, a pivotally mounted handle adapted to engage said operating plate so as to rotate the latter on its pivotal mounting, and a link connecting the operating plate and the movable part, said handle projecting thru the covering plate and being provided with a releasable catch means mounted to engage the front covering plate and to restrain movement of the handle.

24. In a switch, a movable part, means for moving said movable part comprising a pivotally mounted operating plate, a pivotally mounted handle adapted to engage said plate so as to rotate the latter on its pivotal mounting, and a link connecting the plate and the movable part, there being a quick break means including a headed link connected to the handle and surrounded by a coiled compression spring disposed between the headed end of the link and a part of the operating plate, the spring being substantially completely surrounded by the operating plate and the parts associated therewith so that, in the event of the spring breaking, broken parts thereof cannot readily come in contact with live current-carrying parts of the switch.

25. For use with a number of other units to form a panel, a self contained switch unit comprising a front panel forming plate having an area greater than that of the parallel plane cross section of the switch parts, the margins of the plate providing means for mounting the unit to a panel frame, with the switch parts being carried by the plate, a normally closed openable door in and forming part of said plate, and a switch handle projecting through said door and operable to move the switch parts while the door remains closed.

26. For use with a number of other units to form a panel, a self contained switch unit comprising a box-like switch casing and a front panel forming plate secured thereto, the plate having an area greater than that of the parallel plane cross section of the switch casing, the margins of the plate providing means for mounting the unit to a panel frame, with the casing and its contents being carried by the plate, a normally closed openable door for said casing and forming part of said plate, and operating parts of said switch being inside the casing and a switch handle projecting thru said door, and operable to move the switch operating parts while the door remains closed.

27. For use with a number of other units to form a panel, a self contained switch unit comprising a box-like switch casing and a front panel forming plate secured thereto, the plate having an area greater than that of the parallel plane cross section of the switch casing, the margins of the plate providing means for mounting the unit to a panel frame, with the casing and its contents being carried by the plate, a normally closed openable door for said casing and forming part of said plate, the casing including side walls, a back wall, and a bottom wall operating parts of said switch inside the casing, and a switch handle projecting through said door, and operable to move the switch operating parts while the door remains closed.

28. For use with a number of other units to form a panel, a self contained switch unit comprising a box-like switch casing and a front panel forming plate secured thereto, the plate having an area greater than that of the parallel plane cross section of the switch casing, the margins of the plate providing means for mounting the unit to a panel frame, with the casing and its contents being carried by the plate, a normally closed openable door for said casing and forming part of said plate, the casing including side walls, a back wall, and a bottom wall, the back wall providing a panel for fixed contacts of the switch operating parts of said switch inside the casing, and a switch handle projecting through said door, and operable to move the switch operating parts while the door remains closed.

29. In a switch unit, a front plate, whose margins provide means for mounting the unit, a movable switching panel behind and substantially parallel to the front plate and supported to move bodily away from the front plate, continually remaining substantially parallel thereto, a normally closed openable door in and forming part of said plate, and a handle projecting transversely to and through said door and operatively connected to the movable panel for moving the latter for switching action.

30. In a switch unit, a front plate, whose margins provide means for mounting the unit, a movable switching panel behind and substantially parallel to the front plate and supported to move bodily away from the front plate, continually remaining substantially parallel thereto, a normally closed openable door in and forming part of said plate, and a handle projecting transversely to and through said door and operatively connected to the movable panel for moving the latter for switching action, the panel having switching contacts on its rear side and fuse holders on its front side.

HARRISON J. L. FRANK.
WILLIAM H. FRANK.